United States Patent
Martin et al.

(10) Patent No.: US 12,328,091 B2
(45) Date of Patent: Jun. 10, 2025

(54) CONTROLLER FOR CONTROLLING AN ELECTRICAL POWER SUPPLY SYSTEM

(71) Applicant: Liebherr-Components Colmar SAS, Colmar (FR)

(72) Inventors: Mikaeel Martin, Bergheim (FR); Martin Amann, Fegersheim (FR)

(73) Assignee: LIEBHERR-COMPONENTS COLMAR SAS, Colmar (FR)

( * ) Notice: Subject to any disclaimer, the term of this patent is extended or adjusted under 35 U.S.C. 154(b) by 105 days.

(21) Appl. No.: 17/931,496

(22) Filed: Sep. 12, 2022

(65) Prior Publication Data

US 2023/0079063 A1     Mar. 16, 2023

(30) Foreign Application Priority Data

Sep. 13, 2021   (DE) .................... 10 2021 123 646.0

(51) Int. Cl.
*H02P 9/04*     (2006.01)
(52) U.S. Cl.
CPC ..................... *H02P 9/04* (2013.01)
(58) Field of Classification Search
CPC ........................................................ H02P 9/04
See application file for complete search history.

(56) References Cited

U.S. PATENT DOCUMENTS

| | | | |
|---|---|---|---|
| 4,629,968 A | 12/1986 | Butts et al. | |
| 5,311,063 A | 5/1994 | Hubler | |
| 6,534,958 B1 | 3/2003 | Graber et al. | |
| 7,098,628 B2 | 8/2006 | Maehara et al. | |
| 8,040,112 B2 * | 10/2011 | Kikuchi | H02J 7/243 322/36 |
| 8,080,888 B1 | 12/2011 | Daley | |
| 8,205,594 B2 | 6/2012 | Fore et al. | |
| 8,493,038 B2 * | 7/2013 | Kikuchi | H02P 9/48 322/44 |
| 8,744,677 B2 * | 6/2014 | Shimasaki | B60L 15/20 303/152 |
| 10,707,788 B2 * | 7/2020 | Ansbacher | H02P 9/006 |
| 2003/0204989 A1 | 11/2003 | Tocquin et al. | |

(Continued)

FOREIGN PATENT DOCUMENTS

| | | |
|---|---|---|
| EP | 3570427 A1 | 11/2019 |
| JP | H07238847 A | 9/1995 |

(Continued)

OTHER PUBLICATIONS

European Patent Office, Extended European Search Report Issued in Application No. 22187521.4, Jan. 19, 2023, Germany, 7 pages.

*Primary Examiner* — Tulsidas C Patel
*Assistant Examiner* — Thomas K Quigley
(74) *Attorney, Agent, or Firm* — McCoy Russell LLP

(57) ABSTRACT

The present disclosure comprises a controller for controlling an electrical power supply system, the electrical power supply system comprising a generator for generating electrical energy and an engine for driving the generator, wherein the controller comprises a first control mode in which the generator is feedback-controlled on the basis a difference between an output voltage produced by the generator and a target voltage. The controller further comprises at least a second control mode in which the generator is feedback-controlled on the basis of engine speed and/or independently of output voltage.

23 Claims, 5 Drawing Sheets

(56) References Cited

U.S. PATENT DOCUMENTS

| | | |
|---|---|---|
| 2004/0084965 A1 | 5/2004 | Welches et al. |
| 2005/0140142 A1 | 6/2005 | Welches et al. |
| 2007/0228735 A1 | 10/2007 | Becker |
| 2009/0267353 A1 | 10/2009 | Kamimura et al. |
| 2011/0109278 A1 | 5/2011 | Kikuchi et al. |
| 2012/0138582 A1 | 6/2012 | Radtke et al. |

FOREIGN PATENT DOCUMENTS

| | | |
|---|---|---|
| WO | 2013030759 A2 | 3/2013 |
| WO | 2017147595 A1 | 8/2017 |

\* cited by examiner

CONTROLLER FOR CONTROLLING AN ELECTRICAL POWER SUPPLY SYSTEM

CROSS REFERENCE TO RELATED APPLICATION

The present application claims priority to German Patent Application No. 10 2021 123 646.0, filed on Sep. 13, 2021. The entire contents of the above-listed application are hereby incorporated by reference for all purposes.

TECHNICAL FIELD

The present application relates to a controller for controlling an electrical power supply system, as well as an electrical power supply system comprising such a controller. The electrical power supply system comprises a generator for generating electrical energy and an engine for driving the generator. Such power supply systems are often called a GenSet. The generator may also be referred to as an alternator.

BACKGROUND

Today there is a real need for manufacturers of power supply systems and generators to have robust electrical power supply. In particular, this consists in recovering faster and better after a load impact.

Two main lines of research are available to try to improve engine transient performances: either hardware has to be changed (turbocharger size/matching, size of cylinders . . . ) or the control loop of the power supply system has to be reworked.

SUMMARY

This disclosure is related to the control of the alternator, i.e., the generator for generating electrical power. An Automatic Voltage Regulator is typically used to control the output alternator voltage. The voltage is sensed and compared to a referenced voltage (constant rated voltage). When power is suddenly requested to the alternator from a load, the alternator needs to supply current to the load while maintaining the rated voltage. In a Genset powered by a diesel engine, the electrical power is coming from the diesel mechanical engine. A sudden rise of electrical power means a sudden torque demand to the engine. Due to physical limitations, a diesel engine is not able to provide a huge step of mechanical power instantaneously. The load has to be managed according to diesel engine capacity; otherwise, there is a high risk of stalling.

To protect the engine from stalling, the so-called AVR (Automatic Voltage Regulator) has to "help" the engine by controlling the load requested from the engine.

The standard approach is the following: When an electric load is applied to the alternator, the voltage decreases. The voltage regulator compensates by increasing the alternator exciter current. The increase of load (increase of torque) makes the engine speed dropping.

This is because engine speed is typically controlled by a speed feedback loop implemented in the engine controller. Because of hardware limitations but also because of emissions limitations (for example smoke limitations), the engine controller is not able to maintain the target speed (or network frequency).

If the engine speed drops below a threshold limit (for example 48 Hz for a 50 Hz engine), the alternator voltage regulator applies an unload factor to decrease the voltage target and to let time to the engine to increase its air mass flow which is necessary to increase the fuel quantity. The unload factor might be directly proportional to the engine speed drop or it might be the result of a specific Volt/Hz curve.

While this standard approach works well for relatively small engines or atmospheric engines, it can cause difficulties to recover for larger alternator prime movers equipped with turbo chargers. Transient engine performances are decreasing with engine Break Mean Effective Pressure (BMEP).

There is a real need to improve transient performances of generators powered by heavy-duty engines. For high BMEP engines, the full power requested to the engine is extremely high: a 0 to 100% power step can only be achieved if the AVR is subtly releasing the load. Existing available AVR solution are not appropriated to the size and the characteristics of the engine: generator transient performances therefore have to be improved using an adequate AVR strategy.

Different approaches exist in the literature, even if for large engines and for relevant applications, feedback based technics control are the most used:

Feedback Control:

In a power control system and method shown in US20070228735A1, the voltage target is proportional to engine speed drop. This is the common approach to control alternator voltage.

In a method for regulating a generator set described in WO 2013/030759 A1, when the engine speed is dropping below a knee value (48 Hz for example), the voltage target of the alternator is suddenly decreased to a value function of the speed derivative (and not a predetermined value, this is to limit the voltage drop for small impact). Once the engine speed is close to rated speed, the voltage target is gradually increased to the nominal voltage.

Predictive Control (Feedforward):

In a generation control system shown in U.S. Pat. No. 7,098,628 B2, when a large electrical load is applied to the generator, the alternator controller senses a drop in generator output voltage. The controller then operates the idle speed control system of the engine in such a manner as to increase the fuel-air mixture in anticipation of the fact that the field current will be increased. The disclosure also contains a stall-save feature: if the speed is suddenly decreasing while it is operating in its idle speed range, the field current is reduced to a minimum value to reduce the torque load imposed on the engine. The system is limited to control an engine in idle speed.

In a genset control system having predictive load management shown in U.S. Pat. No. 8,205,594 B2, the strategy is based on the prediction of a load. The load change may be calculated, estimated, and/or measured directly. When a load is predicted, the alternator controller sends a signal to the engine controller. If the desired adjustment could cause a too much speed deviation, then the engine controller adjusts or determines a change to accommodate the desired adjustment prior to the increase of the electrical load.

The object of the present disclosure is to provide an improved controller for an electrical power supply system.

The present disclosure provides a controller for controlling an electrical power supply system, the electrical power supply system comprising a generator for generating electrical energy and an engine for driving the generator, wherein the controller comprises a first control mode in which the generator is feedback-controlled on the basis a difference between an output voltage produced by the generator and a target voltage. According to the disclosure, the controller comprises at least a second control mode in which the generator is feedback-controlled on the basis of engine speed and/or independently of output voltage.

The generator (also referred to as alternator in the following) is for example controlled by controlling the exciter of the generator, in particular by controlling of a duty cycle of the exciter and/or the exciter current.

Therefore, in the first control mode, the exciter of the generator, and in particular a duty cycle of the exciter and/or an exciter current, may be feedback-controlled on the basis a difference between an output voltage produced by the generator and a target voltage, and in the second control mode, the exciter of the generator, and in particular a duty cycle of the exciter and/or an exciter current may be feedback-controlled on the basis of engine speed and/or independently of output voltage.

When an electrical load is applied on the alternator, the voltage regulator operating in the first control mode tries to maintain the output voltage by increasing the exciter current in order to increase the torque demand on the engine. Since the electrical time constant of the alternator is much faster than the engine mechanical one, the increase of exciter current leads to a mechanical load torque peak applied on the engine. This load torque peak is making the engine speed dropping.

The disclosure is now based on the realization that the time the engine will need to recover will critically depend on the size of the engine speed drop during load impact. This is related to the fact that GenSet engines are usually sized to run at a specified speed. For lower speed, engine capacities are significantly reduced. Therefore, if the load torque peak and thereby the drop in engine speed is reduced, this will help the engine to recover much faster. The second control mode helps to reduce or minimize the torque peak applied to engine when the impact occurs, thereby improving recovery of the engine.

Contrary to prior art approaches, which always use a feedback control based on output voltage, and only try to adapt the target voltage in order to help the engine, after switching in the second control mode, the present disclosure will feedback-control the generator directly in dependence of engine speed and in particular in dependence on variations in engine speed. The control will be independently of output voltage at least as long as the output voltage does not drop below a minimum value.

Therefore, while in the first control mode, output voltage is the input value for the feedback loop, in the second control mode, engine speed is the input value for the feedback loop. The feedback loop may in particular use a time derivative of engine speed for feedback control.

In an embodiment of the present disclosure, the controller may automatically switch between operation modes in dependence of at least one control input derived from output voltage and/or engine speed. In particular, the controller may automatically switch between operation modes in order to maintain output voltage and/or engine speed at a desired value and/or in a desired range.

In an embodiment of the present disclosure, when entering the second control mode, an initial control value of the generator is calculated based on a control value before entering the second control mode, such as by applying a limitation factor. The engine is therefore initially controlled with a control value that depends on the last control value used when still operating in the first control mode, i.e., before the load impact was detected, and may be increased with respect to this value by a limited amount, for example by a constant factor. This is used to minimize the load torque peak.

In an embodiment of the present disclosure, in the second control mode, the generator is feedback-controlled based on a change in engine speed, wherein a control value of the generator is reduced if engine speed is decreasing. In particular, the control value may be controlled based on a time derivative of the engine speed.

In particular, when entering the second control mode, the controller may start with a maximum initial control value of the generator, and reduce the control value as long as a time derivative of engine speed is not increasing.

In an embodiment of the present disclosure, in the second control mode, a time derivative of the engine speed is monitored and the control value of the generator is no longer reduced and may be kept constant once the time derivative of engine speed is increasing again.

Therefore, once the engine is showing signs of recovery, the control value is no longer reduced.

In an embodiment of the present disclosure, the controller can lock the control value at a minimum value, even if the time derivative of engine speed is not increasing, in order to limit voltage drop. It is always a compromise between engine speed drop, voltage drop, and time needed for recovering.

In an embodiment of the present disclosure, the control value is an output value of the controller used for controlling the generator, in particular for controlling an exciter of the generator.

In an embodiment of the present disclosure, the control value is a duty cycle, in particular a duty cycle of the exciter of the generator.

In an embodiment of the present disclosure, the controller comprises a third control mode in which the generator is feedback-controlled on the basis of a difference between engine speed and a minimum speed value. The third control mode will avoid stalling of the engine.

In an embodiment of the present disclosure, the controller comprises a state machine for switching between the control modes.

In an embodiment of the present disclosure, the controller comprises a load impact detector, wherein the state machine switches between control modes based on the output of the load impact detector, wherein the load impact detector may detect a load impact based on a drop in output voltage.

In an embodiment of the present disclosure, the controller switches to the second control mode when a load impact is detected, in particular when the output voltage drops below a threshold.

In an embodiment of the present disclosure, the threshold is a specified percentage value of rated voltage.

In an embodiment of the present disclosure, the controller switches back from the second control mode to the first control mode once engine speed is increasing again.

In an embodiment of the present disclosure, the controller switches to a third control mode when engine speed drops below a minimum speed threshold. In particular, the controller may switch to the third control mode described above.

In an embodiment of the present disclosure, the controller switches from the third control mode to the first control mode when engine speed raises above the minimum speed threshold.

As described above, in the second control mode, the generator is feedback-controlled based on engine speed and independently of output voltage. Therefore, the drop in engine speed can be reduced while accepting a drop in output voltage.

In an embodiment of the present disclosure, when control is switched to the first control mode, for example from the second or third control mode, the initial target voltage is reduced with respect to rated voltage, wherein the initial target voltage depends on the output voltage at the time of switching and/or can be increased to a rated output voltage with increasing engine speed.

In an embodiment of the present disclosure, when switching to the first control' mode, the generator may be feedback-controlled based on a difference between output voltage and the (reduced) target voltage.

In an embodiment of the present disclosure, the initial target voltage is set to the value of the output voltage that is generated at the time of switching to the first control mode.

In an embodiment of the present disclosure, if the output voltage that is generated at the time of switching to the first control mode is below a minimum voltage threshold, the initial target voltage may be chosen to be at the value of the minimum voltage threshold.

This will avoid that the output voltage will drop to unacceptably low values, but might increase recovery time. It corresponds to setting a minimum unload factor, i.e., a minimum accepted ratio between target voltage and rated voltage.

In an embodiment of the present disclosure, the minimum voltage threshold is a predefined percentage of the target or rated voltage, e.g., of 50% of rated voltage.

In an embodiment of the present disclosure, when switching to the first control mode, the target voltage is increased from the initial target voltage to rated voltage. In some embodiments, the target voltage is increased with increasing engine speed. In an embodiment, the target voltage is increased linearly with engine speed.

In an embodiment of the present disclosure, when switching to the first control mode, the target voltage is linearly plotted from the current speed/initial target voltage point, in particular from the current speed/voltage point, to the rated speed/voltage point.

In an embodiment of the present disclosure, the target voltage will remain at rated voltage until the controller again switches to the second control mode.

In an embodiment of the present disclosure, the controller determines output voltage as the DC voltage of a rectified signal of the generator output AC voltage.

In an embodiment of the present disclosure, the controller determines engine speed form the frequency of the generator output AC voltage, e.g., by monitoring zero crossings of the generator output AC voltage.

In an embodiment of the present disclosure, the electrical power supply further comprises an engine controller for controlling the engine. The engine controller may in particular control an air amount and/or a fuel injection of the engine.

In an embodiment of the present disclosure, the engine controller may be configured to feedback-control the engine in a constant speed mode such that an engine speed is maintained at a target speed. In particular, the target speed may be a predefined target speed. In an embodiment, the target speed is set such that the generator will be driven at a speed to generate the output voltage at a rated frequency of the power grid, e.g., at 50 Hz or 60 Hz.

In an embodiment of the present disclosure, the engine controller will operate in the constant speed mode while the generator is controlled by the controller of the generator in the first, the second and/or the third operation mode. In an embodiment of the present disclosure, the engine controller will operate in the constant speed mode independently of the operation mode of the controller of the generator.

In an embodiment of the present disclosure, the controller only controls the generator and only uses parameters of the output voltage of the generator for feedback control. In this embodiment, the controller is therefore entirely independent from the engine and the engine controller, which may be provided separately.

In a second embodiment, the controller of the present disclosure may also control the engine and/or provide a control output to an engine controller.

In an embodiment of the present disclosure, a target speed of the engine is increased to a value above rated speed in low load conditions. Thereby, if load is increased, there is a speed buffer that will reduce the amount by which engine speed will drop below rated speed.

This feature of the present disclosure may be implemented in the engine controller of the engine and may be implemented independently from the further aspects of the controller of the present disclosure.

In an embodiment of the present disclosure, in at least one control mode, injection of fuel into the engine is controlled in dependence the output voltage of the generator, wherein injection may be increased once a load impact is detected. The load impact may in particular be detected based on a drop in the output voltage. Thereby, a reaction time is reduced with respect to an injection control based on engine speed.

In particular, the controller of the present disclosure may for this purpose output a load impact detection signal to an engine controller of the engine when detecting a load impact and/or when entering into second control mode. The engine controller unit may be configured to react to this signal by adapting engine control. The reaction may depend on engine conditions. In an embodiment, the engine controller may increase the speed if possible, and/or inject up to the maximum fuel quantity instantaneously. In a possible embodiment, the load impact detection signal may be a fuel control signal commanding the engine controller to increase fuel injection.

The controller of the present disclosure may comprise a microprocessor and a software program stored on non-transitory memory, the software program comprising program code comprising instructions that will, when running on the microprocessor, provide the functionality of the controller described herein. In particular, the controller may be configured by the software program to perform the functions de-scribed herein automatically, for example permanently during operation of the engine.

The controller may control the exciter of the generator, and receive input by monitoring the output voltage of the generator.

The present disclosure further comprises an electrical power supply system comprising a generator for generating electrical energy, an engine for driving the generator, and a controller as described above.

The system has the same uses as already described with respect to the inventive controller.

In particular, the present disclosure is related to a new automatic voltage regulator designed for a heavy engine based generator. The role of the voltage controller is to maintain the alternator output voltage at the rated voltage while limiting the output electrical power fluctuations or deviations. Engine speed drop, voltage dip, frequency recovering time and voltage recovering time are the four electrical characteristics to optimise.

The proposed voltage controller differs from the existing structures as it takes into account engine physical capacity. However, the algorithm is completely independent from engine manufacturer: there is no need to embed any engine data, nor to implement a load profile library.

The disclosure claims a strategy to limit the mechanical torque peak applied to the engine crankshaft. For that purpose, the proposed automatic voltage regulator embeds a state machine including a load impact detection and at least two or three different controllers or control modes.

This control structure brings the following benefits:
a considerable reduced engine speed drop,
a significant recovering time improvement,
a simple and comprehensive set of calibration parameters
an engine stall saver.

BRIEF DESCRIPTION OF THE FIGURES

The present disclosure is now described in more detail with reference to the following embodiment and drawings.
The drawings show.

DETAILED DESCRIPTION

Figure 5:
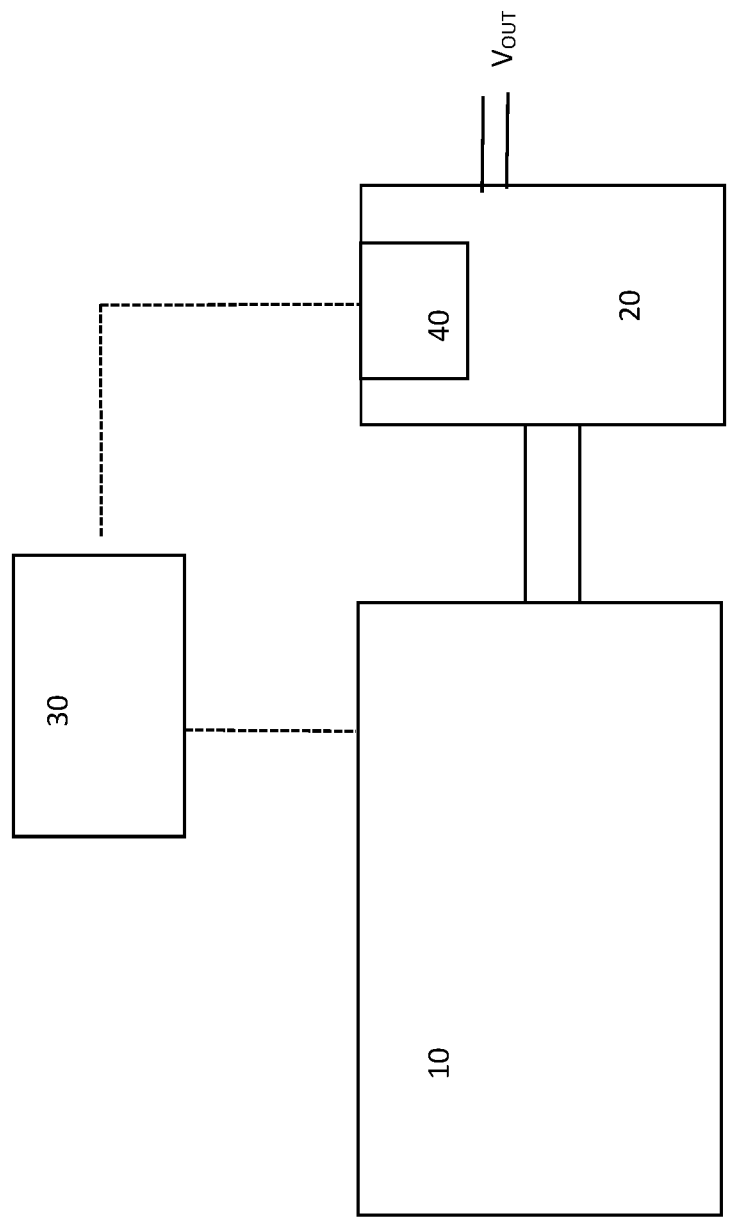

The basic constituents of an embodiment of an electrical power supply system according to the present disclosure are shown in FIG. 5.

The electrical power supply system comprises an engine 10, a generator 20 driven by the engine and outputting an output voltage $V_{OUT}$ and a controller 30 controlling the generator and/or the engine. In particular, the controller 30 may control an exciter 40 of the generator 20. The engine is an internal combustion engine, and may for example be a diesel engine or a gas engine. In particular, the engine may comprise a turbocharger.

Figure 1:
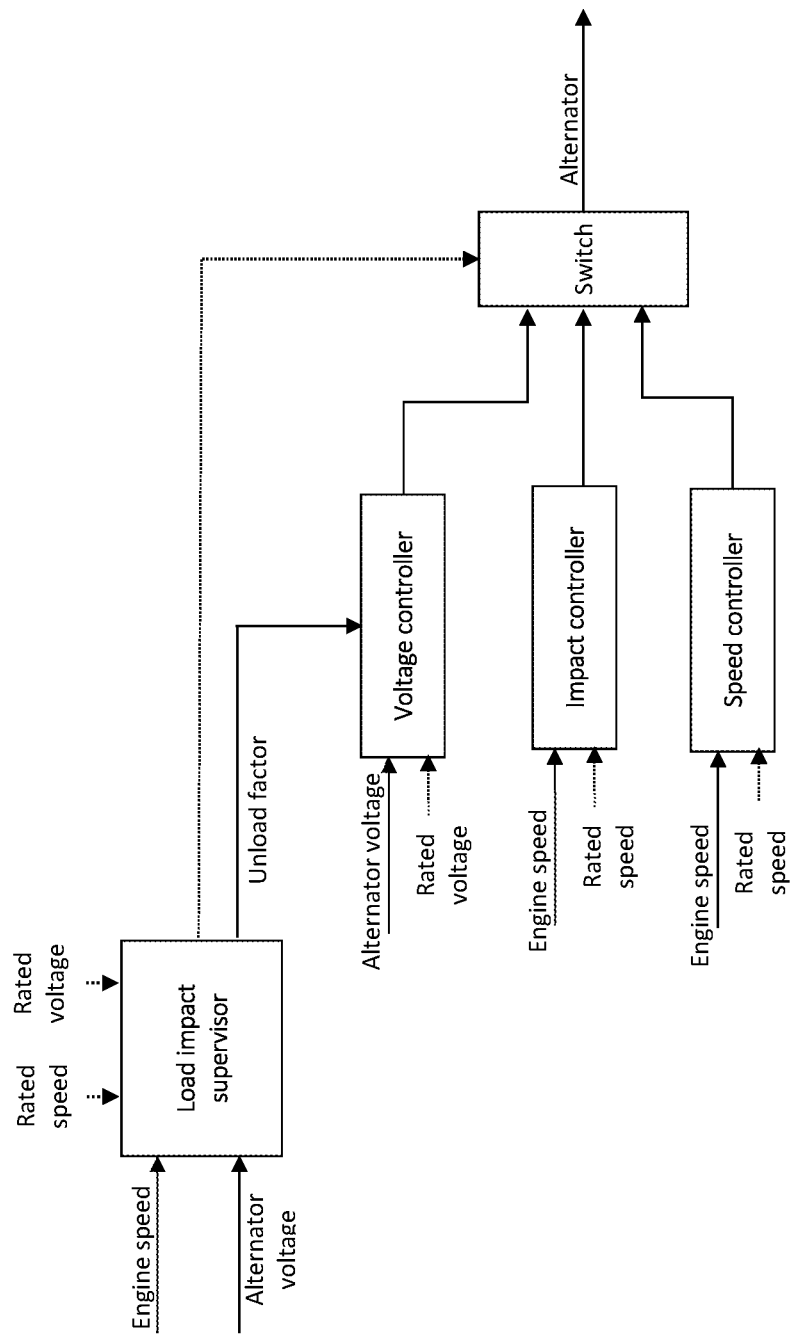
FIG. 1 an embodiment of a controller according to the present disclosure,
FIG. 2 an embodiment of a state machine used for switching between control modes in an embodiment of the present disclosure,
FIG. 3 a diagram showing the unload factor determination in an embodiment of the first control mode,
FIG. 4 a diagram showing load torque and engine speed after a load impact in an embodiment of the present disclosure and
FIG. 5 a schematic drawing showing an energy supply system of the present disclosure.

An embodiment of a controller layout according to the present disclosure is shown in FIG. 1.

The controller only senses the alternator output 3-phase AC voltage signal to regulate the voltage. An image of the engine speed signal is computed from the voltage zero crossing signals. Further, the output voltage is determined by rectifying the AC voltage signal to a DC voltage signal.

A load impact supervisor controls the duty cycle to be applied to the alternator exciter 40 while monitoring both the alternator output voltage and frequency.

The present disclosure thereby it takes into account engine physical capacity.

The state machine controller minimises the load torque peak which is following the impact. It has the benefit to minimise the engine speed drop and then maintain the highest air mass flow as possible. The injected fuel quantity is then maximised.

An embedded algorithm prevents the engine from stalling by monitoring the engine speed.

The state machine embeds three different controllers or control modes. An algorithm selects and activates the adequate controller depending on the generator condition.

In the embodiment, the voltage controller algorithm includes four states and three different controllers: voltage controller (corresponding to the first control mode), impact controller (corresponding to the second control mode) and speed controller (corresponding to the third control mode).

The basic functionality of the three controllers is as follows:
Voltage controller: This is the "nominal controller". It regulates the voltage to rated voltage including an unload factor helping the engine to recover from a load impact.
Impact controller: It limits the engine speed drop right after the impact. As soon as a voltage drop is detected, alternator load is optimised to limit the load torque peak.
Speed saver controller: It acts as an emergency backup in case engine speed drops below a critical value. It prevents the engine from stalling at a cost of voltage drop.

Figure 2:
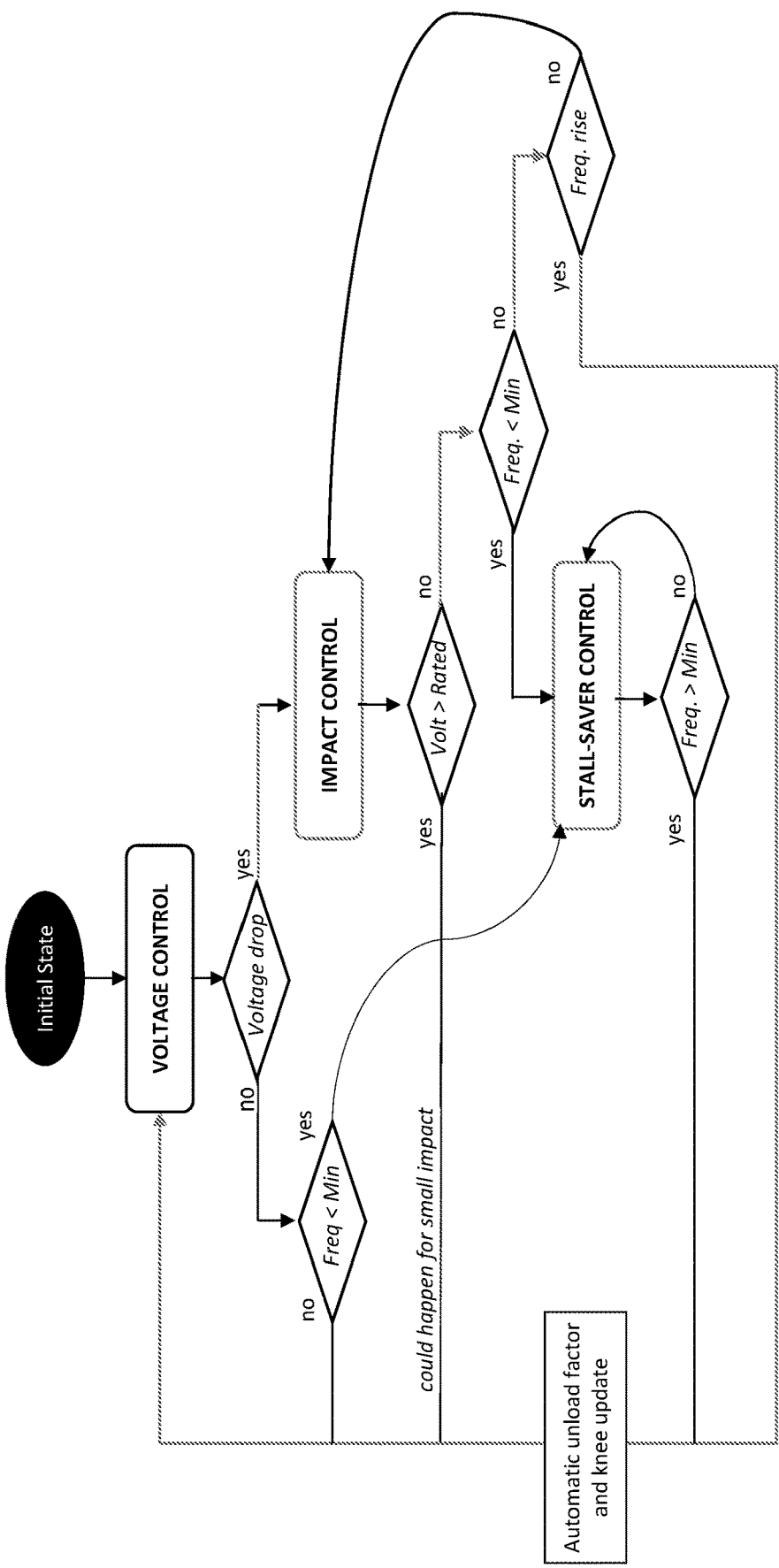

FIG. 2 is a simplified decision tree to represent the transitions between the different states. It might be necessary to compute a consolidated value for decision signals used to leave and activate a state. The consolidated signals prevent the algorithm from oscillating between states. A simple mean value might be computed to get a consolidated signal.

In more detail, the state machine might comprise the following states and/or transitions:
Initialisation state: this is the initial state when engine is starting. Both speed and voltage signals are below their rated value. When this state is activated, the alternator is regulated in voltage using the voltage controller (PI controller). As soon as both (consolidated) speed and voltage signals have reached the rated value, the machine goes in voltage state. Only a reset signal can activate again the initialisation state.
Voltage state: this is the nominal state. It regulates the voltage to rated voltage including an unload factor helping the engine to recover from a load impact (see FIG. 3). The unload factor is automatically computed by the algorithm when the voltage state is entered after a load impact has occurred.
To prevent unwanted duty cycle peaks from occurring, the output duty cycle is always limited to $LimitMax_{volt}$. This upper limit is computed using the (consolidated) duty cycle ($MEAN_{DTC}$), a configurable $C_{maxDTC}$ and the absolute maximal duty cycle $MAX_{DTC}$. This protection helps to maintain the duty cycle in an acceptable range at the very beginning of the impact, while the impact is not yet detected.

Limit $Max_{volt}=(MEAN_{DTC}+C_{maxDTC}*(MAX_{DTC}-MEAN_{DTC}))$

Impact state: it regulates the engine speed to limit the engine speed drop right after the impact. As soon as a voltage drop is detected, alternator load is optimised to limit the load torque peak. When entering this state, an initial duty cycle is computed by the algorithm (initial value=$LimitMax_{impact}$) and applied to the alternator exciter. Depending on the speed deviation, the duty cycle is adjusted through a P controller. During this state, the duty cycle can only vary within a limited range defined by the (consolidated) duty cycle before the impact ($IMPACT_{DTC}$), the absolute maximal duty cycle ($MAX_{DTC}$) and configurable min/max factors ($C_{minDTC}$ and $C_{maxDTC}$). The absolute maximal duty cycle is the required duty cycle value to get the maximal mechanical output from the engine. The DTC limitation contributes to minimise the load torque peak responsible of engine speed drop. In this state, the (consolidated) derivate of the speed is monitored to get the acceleration. As soon as the engine is showing signs of recovery, such as the engine speed initiating a rise (positive acceleration), the state machine supervisor that implements the control strategy and controls the state machine keeps the (consolidated) current voltage ($IMPACT_{Volt}$) and the (consolidated) current frequency ($IMPACT_{Freq}$) in memory to later update the unload factor and activates the voltage state.

$$LimitMax_{impact} = (IMPACT_{DTC} + C_{maxDTC} * (MAX_{DTC} - IMPACT_{DTC})$$

$$LimitMin_{impact} = (IMPACT_{DTC} + C_{minDTC} * (MAX_{DTC} - IMPACT_{DTC})$$

Stall-saver state: this is an emergency state in case the (consolidated) engine speed shrinks below a critical speed. The stall-saver state can be activated when current state is either the voltage state or the impact state. The engine control unit controls the engine smoke by limiting the fuel quantity according to the engine speed. If engine speed drops too much, the allowed fuel quantity is very low preventing the engine from recovering. In this case, the duty cycle applied to the alternator exciter is adjusted through a PI controller based on speed deviation. As soon as the (consolidated) speed is above the critical speed, the supervisor keeps the (consolidated) current voltage in memory to later update the unload factor and activates the voltage state.

The state machine supervisor activates the impact state if the (consolidated) voltage dip in the voltage state is greater than a predefined value. This is the case when an impact is occurring. The (consolidated) duty cycle is kept in memory as duty cycle before impact, and will be used in impact state. Voltage dip is the difference between the current measured voltage signal and a reference signal. The reference signal may be the rated voltage value or a lower voltage value saved in memory, which happens when the impact is occurring during an impact. In particular, the controller may continuously update a previous (consolidated) voltage value to evaluate at any time a new voltage drop resulting from a new impact (even if an impact is already ongoing).

Figure 3:
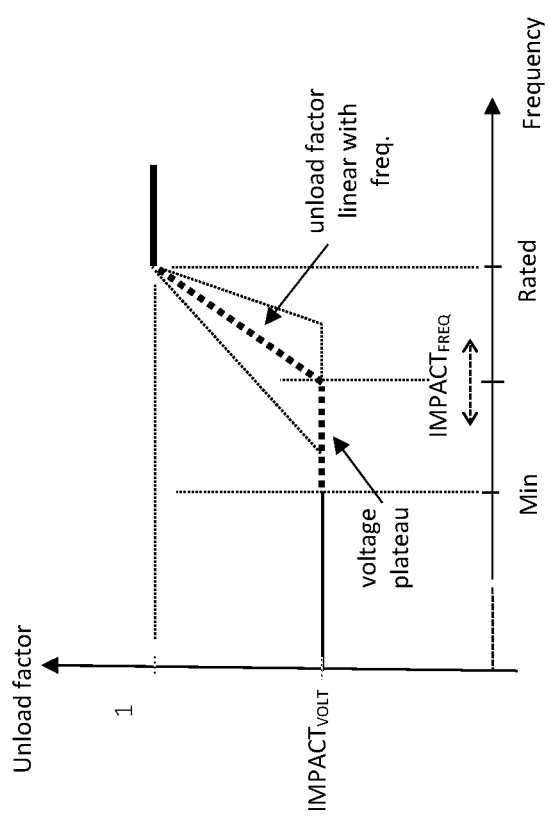

The determination of the unload factor is shown in more detail in FIG. 3. It helps the engine to recover when state machine is in voltage controller case.

A set of two parameters is used to define the unload factor shape. These parameters are both automatically computed by the supervisor module any time it switches from impact or speed controller to voltage controller (and only at the time the voltage controller is activated):
- minimum unload factor: minimum accepted ratio between output voltage and rated voltage
- impact frequency: frequency when voltage controller is activated The impact frequency IMPACT_Freq is the frequency measured at the minimum voltage, when the engine shows sign of recovering.

Voltage controller maintains a minimum load until engine exceeds the impact frequency. From impact frequency to rated frequency, unload factor is linear.

The speed controller protects the engine from stalling in case engine speed drops below a "critical" value.

If engine is not able to follow the voltage reference (for whatever reason), engine speed will decrease until a critical value. Speed controller is activated to increase the engine frequency by reducing the load. This will affect the voltage performance but it assures that engine is not stalling.

As soon as the speed is above the critical threshold, unload factor shape is updated (=new set of parameters computed) and the voltage is then controlled until full recovering.

Complementary Features

Although the proposed voltage controller significantly improves the transient behaviour of a Genset, the following features are additional and complementary means to improve the Genset performance.

While the voltage state machine based controller is only based on alternator controller side, the Extra Speed Approach (ESA) and the Fast Injection Demand (FID) are based on engine side.

Extra Speed Approach

Usual requirements for diesel Genset engines specify that the engine shall run at rated frequency ±4%. Extra Speed Approach (ESA) is using this tolerance in speed. When the engine detects very low load (meaning injection fuel quantity is small), Engine Control Unit controller increases by 3% the target speed. 1% margin is considered.

Engine air mass flow is increased when engine speed is increased, which helps to create torque when load impact is applied. As soon as the fuel quantity increases (with load), the Engine Control Unit brings the speed target back to the rated value. The transition is handled by a curve (Target speed versus Fuel quantity).

Fast Injection Demand

Engine speed is dropping when a load impact is applied to the engine. In reaction to the speed drop, Engine Control Unit speed controller requests to inject more fuel until one of the fuel limitations is reached. The time to reach the fuel limitations is depending on the speed drop dynamic and speed controller parameters' settings. The possibility to inject as fast as possible the maximal fuel quantity as soon as the load impact is occurring will increase the engine reactivity and speed drop shall be reduced. The proposed voltage controller provides such "impact detection" signal and it could be used to trigger the maximal fuel demand.

Some of the key features of the present disclosure are again shortly described in following:

Automatic Load Impact Management.

The controller automatically detects the load impact and minimises the load torque peak that is following the impact. This has the benefit to minimise the engine speed drop and then maintain the highest air mass flow as possible (maximised injected fuel quantity).

Automatic Stall-Saver Protection Activation

An embedded algorithm selects and activates the adequate controller depending on the generator condition. It also prevents the engine from stalling by monitoring the engine speed.

Figure 4:
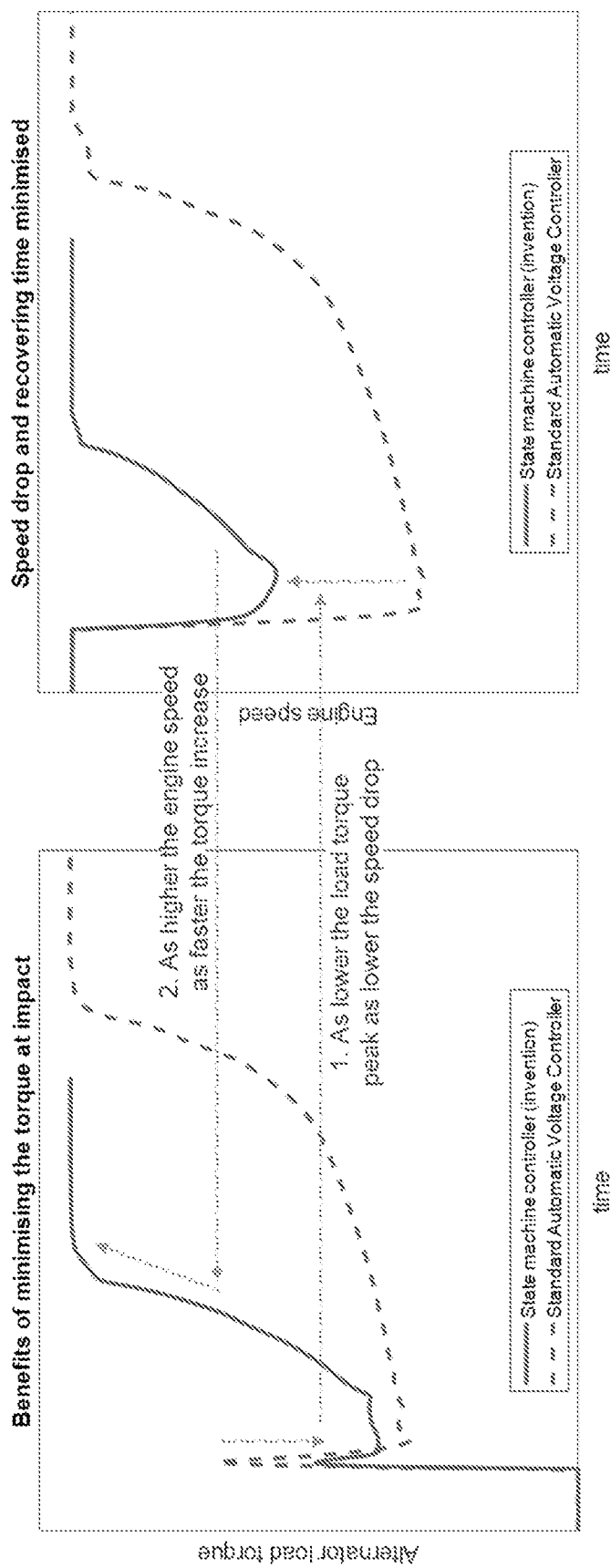

As shown in FIG. 4, the generator performance shows that the load torque peak generated at the moment of the impact is critical for the engine:
- as lower the load torque peak as lower the speed drop
- as higher the engine speed as faster the torque increase.

The present disclosure therefore reduces load torque peak at the moment of load impact.

The present disclosure is not engine specific and could be applied on all heavy-duty machines.

The disclosure has been designed and tested for diesel engine, but can also be used for gas engines.

The present disclosure is in particular used with engines comprising at least one turbocharger.

The invention claimed is:

1. A controller for controlling an electrical power supply system, the electrical power supply system comprising a generator for generating electrical energy and an engine for driving the generator,
wherein the controller comprises a first control mode in which the generator is feedback-controlled on the basis a difference between an output voltage produced by the generator and a target voltage, and
wherein the controller comprises at least a second control mode in which a time derivative of engine speed is monitored and the generator is feedback-controlled using the time derivative of engine speed as an input value of the feedback-control.

2. The controller according to claim 1, wherein the generator comprises an exciter operated with an exciter duty cycle and/or an exciter current, which is controlled by the controller as a control value of the feedback-control in the first control mode and the second control mode, and when entering the second control mode, an initial value of the exciter duty cycle and/or the exciter current is calculated based on a value of the exciter duty cycle and/or the exciter current before entering the second control mode.

3. The controller according to claim 1, wherein the generator comprises an exciter operated with an exciter duty cycle and/or an exciter current, which is controlled by the controller as a control value of the feedback-control in the first control mode and the second control mode, and wherein in the second control mode, the feedback-control of the controller continually reduces a value of the exciter duty cycle and/or the exciter current as long as the time derivative of engine speed is not increasing.

4. The controller according to claim 3, wherein in the second control mode, the controller locks the value of the exciter duty cycle and/or the exciter current once it reaches a minimum value, even if the time derivative of engine speed is not increasing.

5. The controller according to claim 1, wherein the controller comprises a third control mode in which engine speed is monitored and used as the input value of the feedback control, and wherein the generator is feedback-controlled on the basis of a difference between the engine speed and a minimum speed value.

6. The controller according to claim 1, wherein the controller comprises a state machine for switching between the control modes.

7. The controller according to claim 6, wherein the controller comprises a load impact detector, and wherein the state machine switches between control modes based on the output of the load impact detector.

8. The controller according to claim 6, wherein the controller switches to the second control mode when a load impact is detected.

9. The controller according to claim 6, wherein the controller switches back from the second control mode to the first control mode once engine speed is increasing.

10. The controller according to claim 6, wherein the controller switches to a third control mode when engine speed drops below a minimum speed threshold.

11. The controller according to claim 10, wherein the controller switches back from the third control mode to the first control mode once engine speed is increasing above the minimum speed threshold.

12. The controller according to claim 4, wherein when control is switched to the first control mode, the target voltage is initially set to a value that is lower than a rated voltage.

13. A controller for controlling an electrical power supply system, the electrical power supply system comprising a generator for generating electrical energy and an engine for driving the generator,
wherein the controller comprises a first control mode in which the generator is feedback-controlled on the basis a difference between an output voltage produced by the generator and a target voltage, and
wherein the controller comprises at least a second control mode in which the generator is feedback-controlled on the basis of engine speed and/or independently of output voltage, and wherein target speed is increased to a value above rated speed in low load conditions.

14. The controller according to claim 1, wherein in at least one control mode, injection of fuel into the engine is controlled based on the output voltage of the generator, and wherein injection is increased once a load impact is detected based on a drop in the output voltage.

15. An electrical power supply system comprising a generator for generating electrical energy, an engine for driving the generator, and a controller according to claim 1.

16. The controller according to claim 4, wherein in the second control mode, the exciter duty cycle and/or the exciter current is kept constant once the time derivative of engine speed is increasing.

17. The controller according to claim 7, wherein the load impact detector detects a load impact based on a drop in output voltage.

18. The controller according to claim 8, wherein the controller switches to the second control mode when the output voltage drops below a threshold.

19. The controller according to claim 12, wherein the value of the target voltage depends on the output voltage at the time of switching and/or is increased to the rated voltage with increasing engine speed.

20. The controller according to claim 12, wherein the value of the target voltage is always set to be at or above a minimum voltage threshold.

21. The controller according to claim 1, wherein in the first control mode, the output voltage is the input value for the feedback control, and in the second control mode, the engine speed derivative is the input value for the feedback control and the output voltage is not used as the input value for the feedback control, such that in the second control mode, the generator is feedback-controlled independently of output voltage.

22. The controller according to claim 1, further comprising an engine controller for controlling the engine, wherein the engine controller is configured to feedback-control the engine in a constant speed mode such that an engine speed is maintained at a target speed, and wherein the target speed is set such that the generator is driven at a speed to generate the output voltage at a rated frequency of a power grid.

23. A controller for controlling an electrical power supply system, the electrical power supply system comprising a generator for generating electrical energy and an engine for driving the generator,
wherein the controller comprises a first control mode in which the generator is feedback-controlled on the basis of a difference between an output voltage produced by the generator and a target voltage,
wherein the controller comprises at least a second control mode in which a time derivative of engine speed is monitored and the generator is feedback-controlled using the time derivative of engine speed as an input value of the feedback-control, wherein the generator comprises an exciter operated with an exciter duty cycle and/or an exciter current, which is controlled by the controller as a control value of the feedback-control in the first control mode and the second control mode, wherein the controller switches from the first control mode to the second control mode once a load impact, leading to a drop in engine speed, is detected, and wherein, in the second control mode, the feedback-control of the controller continually reduces a value of the exciter duty cycle and/or the exciter current as long as the controller does not determine that the engine will recover from the drop in engine speed, and wherein the controller determines that the engine will recover from the drop in engine speed by evaluating the time derivative of engine speed.

* * * * *